June 6, 1967 R. G. SUNBLADE ETAL 3,324,252

PHONOGRAPH CARTRIDGE

Filed July 8, 1964

Inventors
Richard G. Sunblade
Edward E. Heyn
By Welsh and Broadway
Attorneys

United States Patent Office 3,324,252
Patented June 6, 1967

3,324,252
PHONOGRAPH CARTRIDGE

Richard G. Sunblade, Westmont, and Edward E. Heyn, Lombard, Ill., assignors, by mesne assignments, to Electro-Voice Incorporated, Buchanan, Mich., a corporation of Indiana Filed July 8, 1964, Ser. No. 381,066
3 Claims. (Cl. 179—100.41)

The present invention relates generally to phonograph cartridges having a piezoelectric transducer element which generates signals in response to the movements of a record engaging stylus. More particularly, the invention relates to cartridges in which the transducer is formed of a material, such as Rochelle salt, of elongated flat rectangular shape adapted to generate a voltage in response to twisting movements about a longitudinal axis of the element.

The primary object of the present invention is to provide a novel cartridge of the above character which is simple and inexpensive to manufacture while still providing desired tracking and frequency response characteristics.

Another object is to support the transducer element and stylus in a novel manner to obtain high sensitivity to lateral forces applied to the stylus and still achieve effective damping.

A further object is to construct the cartridge in a novel manner to facilitate assembly.

Other objects and advantages of the invention will become apparent from the following detailed description taken in connection with the accompanying drawings, in which.

Figure 1:
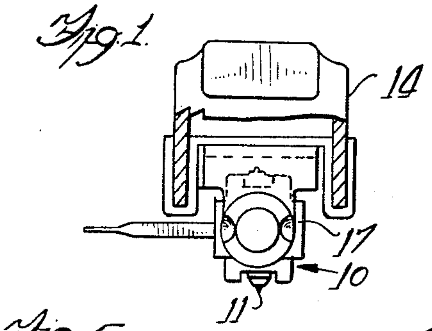
FIGURE 1 is an end elevational view of a cartridge embodying the novel features of the present invention and mounted on a pickup arm, a portion of which is broken away and shown in section.
Figure 2:
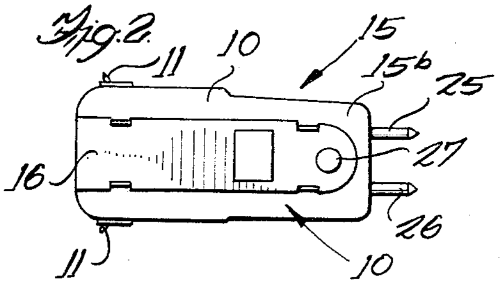
FIGURE 2 is a side elevational view of the cartridge.
Figure 5:
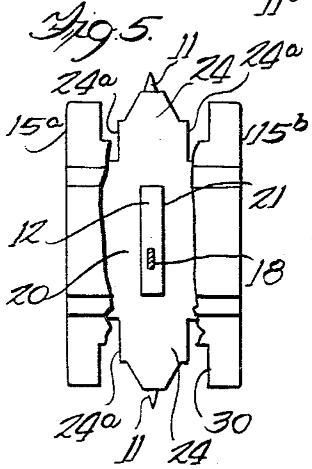
FIGURE 5 is an enlarged end elevational view of the cartridge of FIGURE 2 with some of the parts removed and others broken away.

In the drawings, the invention is shown for purposes of illustration embodied in a phonographic cartridge 10 which is adapted for use with a monaural record (not shown). In such a record, the groove is of constant depth and width but the center line of the groove shifts sideways. A stylus 11 riding in this groove is moved laterally or sideways by contact with the walls of the groove as the center line shifts. The lateral movements of the stylus, due to changes in the position of the center line of the groove, are transmitted to a transducer element 12 of the electro-mechanical type which generates an electrical signal corresponding to the movement of the center line of the groove. To accommodate record grooves of different sizes, there preferably are two styli of correspondingly different sizes as is well known in the art.

The parts of the cartridge 10 are housed within a hollow casing 15 of generally rectangular shape enclosing the transducer element 12 and fitting releasably between the legs of a U-shaped clip 16 which is mounted on the tone arm through the medium of a mounting bracket 17. The construction of the clip and mounting are shown and described more fully in a copending application of Clarence F. Jensen, Serial No. 271,049, filed April 4, 1963, now Patent No. 3,176,993 dated April 6, 1965. To facilitate manufacture and assembly, the hollow casing is divided longitudinally into two identical parts **15*a* and 15*b*** which abut each other along a central dividing plane, these parts being formed by molding a suitable thermosetting resin such as nylon.

The halves of the casing 15 are held in assembled relation by the clip 16 and a rivet 27 which extends through the ends of the clip and alined apertures 28 in the two halves. The transducer 12 is of elongated flat rectangular shape made up in this instance of two slabs of Rochelle salt and generating a voltage in response to twisting about a longitudinal axis. This voltage appears between two strips 18 and 19 of suitable conducting material, one strip being secured between the slabs and the other lying against the other side of one slab.

In accordance with the present invention, the styli 11 and transducer element 12 are supported in the casing in a novel manner to provide a low cost cartridge which is simple to manufacture and easy to assemble while still providing desired frequency response and tracking characteristics. To these ends, the element is embedded in an envelope 20 which supports both the styli and the element in the casing and also acts as a damper. The envelope is made as an elongated one-piece molding of a suitable plastic material and extends throughout the length of the element with lateral projections or arms 24 extending outwardly from opposite edges of the envelope in the plane of the element to support the respective styli adjacent one end of the element. To permit such support of the styli and element and still provide compliance enabling the styli to follow variations in a record groove, one end portion of the envelope is mounted in cantilever fashion with the styli on the other or free end portion of the envelope.

To receive and support the flat, rectangular transducer element 12, the envelope 20 is formed with a central cavity 21 which extends longitudinally throughout the length of the envelope and is of a shape and size complementary to the exterior of the element so that the element is retained in the cavity with a friction fit. The cavity thus is of flat rectangular cross section and its height and width dimensions are only slightly larger than those of the element so as to permit endwise insertion of the element and its exterior conductor strip 19 while still providing the tight fit.

Figure 4:
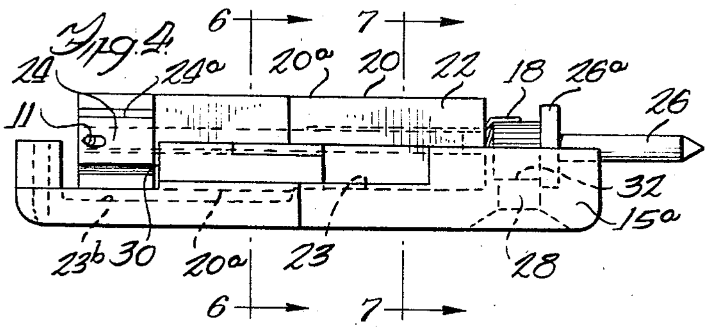
FIGURE 4 is an edge elevational view of the parts of the cartridge shown in FIGURE 3.
Figure 6:
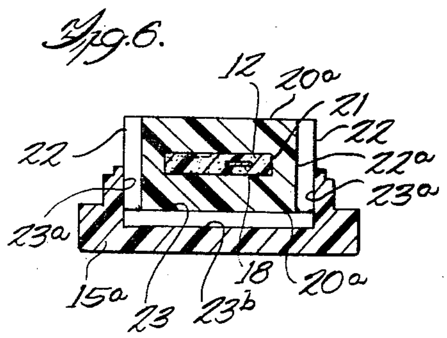
FIGURE 6 is a cross-sectional view taken along the line 6—6 of FIGURE 4.
Figure 7:
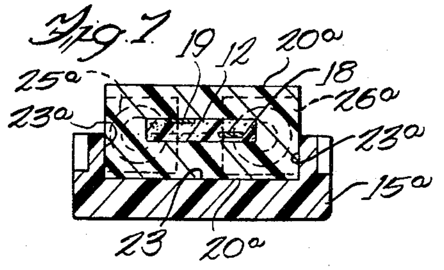
FIGURE 7 is a cross-sectional view taken along the line 7—7 of FIGURE 4.

The cantilever mounting of the envelope 20 and element 12 is obtained simply by clamping the inner end portion of the envelope remote from the styli 11 between the two halves **15*a* and 15*b* of the casing 15 and providing a clearance between the casing and the other or outer end portion of the envelope including the projections 24 for the styli. For this purpose and to facilitate formation of the dies for the envelope and the casing halves, the envelope is made of uniform thickness throughout its length to present two outwardly facing flat sides 20*a* which are engaged by and clamped between two opposed and correspondingly flat surfaces 23 on the two casing halves at the inner end portion of the casing. These flat surfaces are the bottom walls of recesses formed in the casing halves to receive the envelope and having straight side edges 23*a* spaced apart a distance equal approximately to the width of the inner end portion of the envelope to engage the side edges 22 of this end portion and locate it transversely of the casing. To achieve the desired clamping force, the spacing of the opposed recess walls 23** when the casing halves are assembled in edge to edge abutting relation is slightly less than the thickness of the inner end portion of the envelope so that this portion is compressed, the compression being illustrated along the lower side of the envelope as shown in FIG. 4.

While the clearance between the flat sides 20a and side edges 22 of the outer end portion of the envelope 20 and the casing halves 15a and 15b may be obtained in various ways, it is obtained herein by relieving the opposed walls of the recesses at their outer end portions as indicated at 23b and relieving the side edges of the envelope as indicated at 22a between the styli projections 24 and the outer end portion of the envelope. Also, the length of the envelope is slightly less than the length of the recesses so that the outer end of the envelope is spaced from the outer ends of the recesses. Apertures 30 extend through opposite side edges of the outer end portions of the casing halves to receive the projections and expose the styli 11, the edges of these apertures being spaced from the projections by relieving the sides of the projections as indicated at 24a to permit free movement of the projections.

The envelope is molded of a yieldable material capable of absorbing energy and having memory so as to achieve a damping effect while providing sufficient compliance for each stylus 11 to follow undulations in the record groove. One material found to be suitable is a silicon rubber manufactured by Dow Corning Company and sold under the trade name "Silastic."

Figure 3:
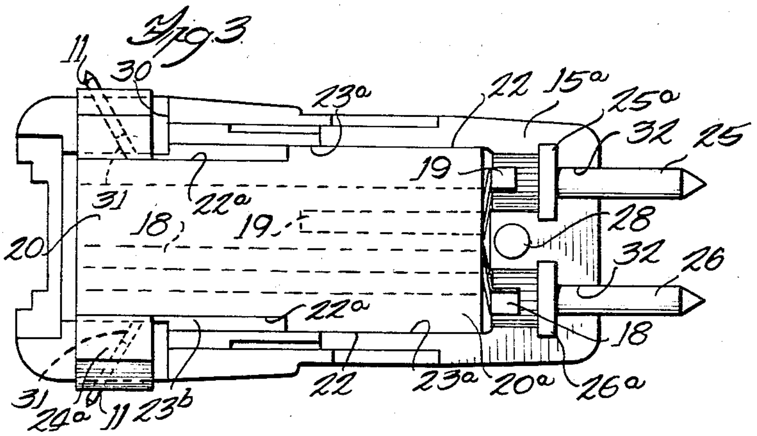
FIGURE 3 is an enlarged side elevational view of the cartridge with the clip and one section of the cartridge casing removed.

Simplification of the construction and reduction of the cost are achieved further by mounting the styli 11 directly in the projections 24 of the envelope or molded body 20. The styli thus are formed as the pointed outer ends of elongated pins whose inner ends extend into apertures 31 extending into the outer ends of the projections (FIG. 3). The pins and apertures in this instance are cylindrical and their diameters are correlated to provide a friction fit for retaining the styli in the projections. To give the desired rake to the styli, the axes of the apertures are inclined toward the outer end of the envelope.

Electrical connection to the conducting strips 18 and 19 is effected through terminal posts 25 and 26 which project longitudinally of the cartridge and outwardly from its inner end and are supported in recesses 32 formed in the casing halves 15a and 15b and extending through their inner ends. The recesses are complementary in shape to the pins and include deep sections receiving square flanges 25a and 26a projecting from the posts intermediate their ends to provide a positive interlock with the casing halves. The exposed ends of the conducting strips 18 and 19 simply overlap the adjacent ends of the terminal posts which herein are cylindrical with longitudinal serrations, each strip contacting a different post.

The cartridge is assembled by inserting the transducer element 12 and its attached conductor strips 18 and 19 into the cavity 21 in the envelope 20 with the strips extending outwardly and to the rear thereof. Then, after the styli 11 are inserted in the openings 31 which have been pierced in the arms 24 and the terminal posts 25 and 26 have been inserted in their recesses 32, the envelope is pressed into one casing half 15a and the conductor strips 18 and 19 are laid on the adjacent ends of their respective posts. Next, the other casing half 15b is pressed onto the envelope to bring its edges into contact with edges of the first casing half. As an incident to this movement, the inner end portion of the envelope is compressed slightly between the casing halves and the terminal posts are locked in place in contact with the conductor strips. Finally, the U-shaped clip 16 is slipped over the casing halves and a rivet 27 is extended through the aligned apertures 28 in the casing and the legs of the clip to fasten the cartridge assembly together.

From the foregoing disclosure, those skilled in the art will readily devise many modifications of the present invention and utilities for the present invention in addition to those here set forth. It is therefore intended that the scope of the present invention be not limited by the foregoing disclosure, but rather only by the appended claims.

We claim:

1. A phonograph cartridge comprising an elongated transducer element, an elongated one-piece envelope of molded plastic material having a central cavity complementary in size and shape to said element and receiving the element with a friction fit, said envelope having at one end side walls facing oppositely away from each other, a casing enclosing said envelope and having an interior recess receiving the envelope and defining in part opposed walls spaced apart by a distance less than said side wall spacing of the envelope and engaging said side walls in compression, the other end of said envelope being spaced from the interior of said casing and unsupported thereby to provide a cantilever support of the envelope, said casing having an aperture extending from said interior recess to the exterior of the casing adjacent to a side edge of said other end portion of said envelope, an integral arm on said envelope projecting from said side edge and into said aperture, and a stylus coupled to said arm and projecting outwardly from the arm and exterior of the casing.

2. A phonograph cartridge comprising the combination of claim 1 wherein the stylus is embedded in said arm and extends outwardly from the arm.

3. A phonograph cartridge comprising the combination of claim 1 wherein the envelope is provided with two integral arms projecting in opposite directions from the side edges thereof and the casing is provided with two apertures confronting said arms, in combination with a second stylus coupled to the second arm.

References Cited

UNITED STATES PATENTS

| | | | |
|---|---|---|---|
| 2,938,966 | 5/1960 | Spence | 179—100.41 |
| 3,002,759 | 10/1961 | Jensen | 179—100.41 X |
| 3,089,922 | 5/1963 | Kelly et al. | 179—100.41 |

FOREIGN PATENTS

| | | |
|---|---|---|
| 1,160,439 | 3/1958 | France. |

NORTON ANSHER, *Primary Examiner.*

J. F. PETERS, *Assistant Examiner.*